April 21, 1931.  B. R. HILL  1,801,812

INSTRUMENT DIAL

Filed Dec. 12, 1930

INVENTOR
Byron R. Hill.
BY
ATTORNEY

Patented Apr. 21, 1931

1,801,812

UNITED STATES PATENT OFFICE

BYRON R. HILL, OF EAST ORANGE, NEW JERSEY, ASSIGNOR TO WESTINGHOUSE ELECTRIC & MANUFACTURING COMPANY, A CORPORATION OF PENNSYLVANIA

INSTRUMENT DIAL

Application filed December 12, 1930. Serial No. 501,880.

My invention relates to an indicating instrument and has special relation to glass dials therefor so constructed that glare, caused by daylight or by artificial lighting, will not affect the reading of the instrument.

In instruments, such as ammeters and volt-meters, it is necessary that a closure or cover of some transparent material, such as glass, be provided for the aperture in the casing through which the relation of the pointer to the scale may be observed. The glass cover, however, is affected by light rays, either from artificial sources or from ordinary daylight, to such an extent that a glare results which makes reading of the meter difficult and sometimes impossible.

A so-called non-glare glass, provided by dipping an ordinary glass in a solution of hydro-fluoric acid until the glass is slightly frosted, has been used to eliminate glare. A disadvantage of the frosted glass is that the pointer and the graduations on the ordinary instrument dial are indistinct and so blurred that it is difficult to obtain an accurate reading. The blur increases as the distance between the frosted glass and the dial is increased.

In practicing my invention I have provided a novel arrangement of parts in which a closure of frosted glass is utilized both for a cover and a dial. The characters and graduations of the dial are painted or marked on either side of the glass, but preferably on the enclosed side for protective purposes, and the pointer or indicator of the instrument is off-set in such manner that its tip travels in a path just below, and in very close proximity to, the dial markings.

An object of my invention is to provide apparatus of the above-mentioned character in which a scale and figures are painted on a slightly frosted glass closure.

Another object of my invention is to provide apparatus, as described above, in which the tip of the instrument indicator or pointer is disposed to travel in a path in close proximity to the dial or closure.

Figure 1:
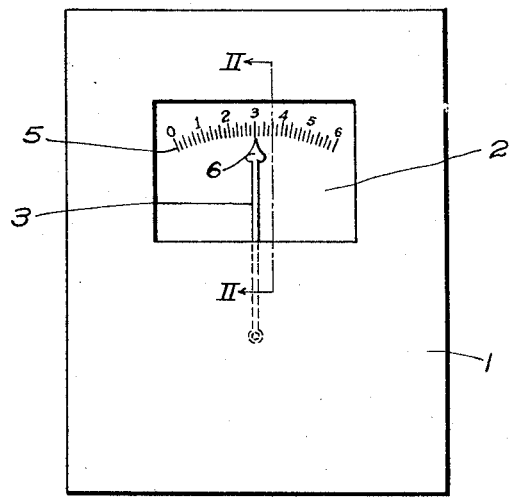
Figure 2:
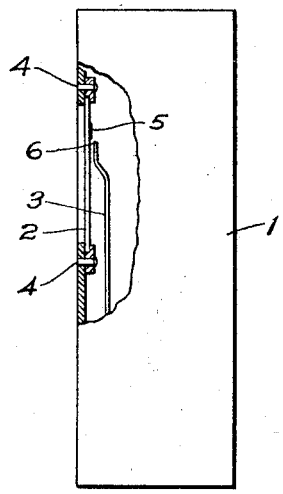

These and other objects, as well as details of construction, whereby my invention may be utilized will be apparent from the following detailed description, taken in conjunction with the accompanying drawing wherein:

Figure 1 is a view in front elevation of an instrument constructed in accordance with my invention; and, Fig. 2 is a view, in side elevation, partly in section, taken on the line II—II of Fig. 1.

Referring to the drawing, a meter casing 1, having a dial 2 and a pointer 3, is shown. The dial 2 is composed of slightly frosted glass and is fixed to the meter casing 1 in any well-known manner, as by rivets 4. A scale 5 is painted or marked on the inside of the dial member 2. A pointer 3, having a tip 6 is adapted to cooperate with the scale 5 to indicate the quantity measured. The pointer 3 is off-set near one end in such manner that the tip 6 will travel in a path in very close proximity to the scale 5. It will be seen that the pointer tip 6 and the scale 5 are so positioned that there is a very slight distance between them at all times.

The advantages of my device are as follows:

Since the closure 2 is also utilized as a dial, a considerable saving is made in the construction of the instrument. As explained above, slightly frosting the glass will entirely eliminate glare and will enable an operator to easily read the meter from any distance and from any angle. The pointer tip being placed in close proximity to the scale on the dial will remove the blurred effect caused by the frosted glass in the old-type meters in which the dial is placed behind the pointer.

I do not wish to be restricted to the specific arrangement of parts herein set forth, as it is obvious that various modifications thereof may be made within the spirit and scope of my invention. I desire, therefore, that only such limitations shall be imposed on my invention as are indicated by the appended claims.

I claim as my invention:

1. In an electrical instrument, the combination with a casing, of a transparent closure for said casing, a scale marked on said closure and a pointer adapted to cooperate with said scale.

2. In an electrical instrument, the combination with a casing, of a glass closure for said casing, a scale marked on said closure and a pointer adapted to cooperate with said scale.

3. In an electrical instrument, the combination with a casing, of a slightly frosted glass closure for said casing, a scale marked on said closure and a pointer adapted to cooperate with said scale.

4. In an indicating instrument, the combination with a casing, of a closure for said casing, a scale marked on said closure, a pointer having a tip adapted to cooperate with said scale, and means for causing said tip to travel in a path in a plane immediately adjacent to the plane of said closure.

5. In an indicating instrument, the combination with a casing, of a glass closure for said casing, a scale marked on said closure, a pointer having a tip adapted to cooperate with said scale, and means for causing said tip to travel in a path in a plane immediately adjacent to the plane of said closure.

6. In an indicating instrument, the combination with a casing of a slightly frosted glass closure for said casing, a scale marked on said closure, a pointer having a tip adapted to cooperate with said scale, and means for causing said tip to travel in a path in a plane immediately adjacent to the plane of said closure.

In testimony whereof, I have hereunto subscribed my name this 8th day of Dec., 1930.

BYRON R. HILL.